United States Patent [19]

Lewis et al.

[11] 3,852,115

[45] Dec. 3, 1974

[54] PRIMARY CELL CASE

[75] Inventors: Richard W. Lewis, E. Grinstead; Richard J. Lines, Maidenhead, both of England

[73] Assignee: Timex Corporation, Waterbury, Conn.

[22] Filed: Jan. 15, 1973

[21] Appl. No.: 323,663

Related U.S. Application Data

[63] Continuation of Ser. No. 107,390, Jan. 18, 1971, abandoned.

[52] U.S. Cl. ............................. 136/111, 136/133
[51] Int. Cl. ............................. H01m 1/02
[58] Field of Search ............ 136/111, 133, 166, 169

[56] References Cited
UNITED STATES PATENTS

| | | | |
|---|---|---|---|
| 2,536,696 | 1/1951 | Ruben | 136/111 |
| 2,697,736 | 12/1954 | Goldberg et al. | 136/133 |
| 3,340,099 | 9/1967 | Sherfey | 136/133 |
| 3,418,172 | 12/1968 | Fletcher | 136/111 |
| 3,440,110 | 4/1969 | Arbter | 136/133 |
| 3,476,610 | 11/1969 | Krebs et al. | 136/111 |

Primary Examiner—Donald L. Walton

[57] ABSTRACT

A primary cell of the button type having a case comprising a bottom can including a top open end, a top cap having a descending flange of predetermined configuration and an annular grommet having a slotted portion to receive the flange of the top cap. The flange portion of the top cap is adhered to the grommet with an adhesive, such as an epoxy resin, along the walls of the slot and at portions above the slot. The open end of the bottom cap is swaged against the grommet to complete the seal.

4 Claims, 3 Drawing Figures

PRIMARY CELL CASE

This is a continuation application of Ser. No. 107,390 filed Jan. 18, 1971 and now abandoned.

BACKGROUND OF THE INVENTION

The present invention relates to primary cells and more particularly to a new and improved construction for the sealing of button type cells.

The small primary energy cells used, for example, in watches and hearing aids, are generally called button cells because of their shape and small size. For example, one type of such cell is a round cell having a height of 0.21 inch and a diameter of 0.45 inch. These cells are generally alkaline primary cells. A typical cell of this type uses a zinc amalgam anode, a mercuric oxide cathode, and an alkaline electrolyte such as sodium hydroxide.

The sodium hydroxide electrolyte is a strongly corrosive liquid which has a tendency to creep, that is, it will climb up the sides of an enclosing vessel. The alkaline electrolyte, and the gases produced in the cell, have presented serious problems in the sealing of cells. The alkaline electrolyte, if it should leak from the cell, may not ruin the cell itself but cause damage to the possibly delicate and expensive device in which the cell is used. Similarly, the gases which might escape from the cell may be corrosive to the device. This problem of leakage of the cell is particularly serious in the case of wrist watches. A wrist watch uses many parts which would be adversely affected by the corrosion occasioned by the leakage of an energy cell within the watch case.

Various solutions have been proposed for the problem of sealing small button type battery cells. For example, it has been proposed that a valve system be incorporated in the energy cell to permit the escape of gas or that an absorbent material be placed in the path of possible leakage to absorb any liquid which may pass the seal. Such devices have not proven entirely satisfactory in the sealing of cells and have subtracted from the amount of active material which may be incorporated in the cell. If a seal were found which would be truly effective in sealing the energy cell against gas and alkaline leakage and which would not add appreciably to the size of the cell, then it would be possible to use a higher weight of electrolyte in the cell, or possibly greater quantities of anode or cathode material, thereby achieving a greater cell capacity for the same size of cell.

U.S. Pat. Nos. 3,418,172; 3,440,110 and 3,457,117 illustrate recent developments in the area of interest.

SUMMARY OF THE INVENTION

In accordance with the present invention, an energy cell of the button type is provided. The cell includes a first can-like portion which is open at one end. A top cap and flexible grommet is also provided, the top cap being substantially convex. The grommet includes a slot located between upwardly projecting walls. The cap and grommet are bonded together by applying an adhesive to the leg position of the top cap and inserting into the grommet slot. Into this assembly is placed the anode material, electrolyte and a plurality of suitable separators. A cathode and barriers are positioned within the bottom can member. The anode and cathode assemblies are brought together by inserting the anode assembly into the open end of the can so that the base of the grommet rests upon the cathode barriers. The top extending side wall of the can is then swaged over to compress the grommet against the top cap.

An object of the present invention to provide a button type primary energy cell which is effectively and completely sealed against leakage.

A further object of the present invention to provide such an energy cell in which the sealing does not substantially subtract from the quantity of active material which may be incorporated within the cell.

Other objects of the present invention will be apparent from the following detailed description taken in conjunction with the accompanying drawings.

DETAILED DESCRIPTION

Figure 1:
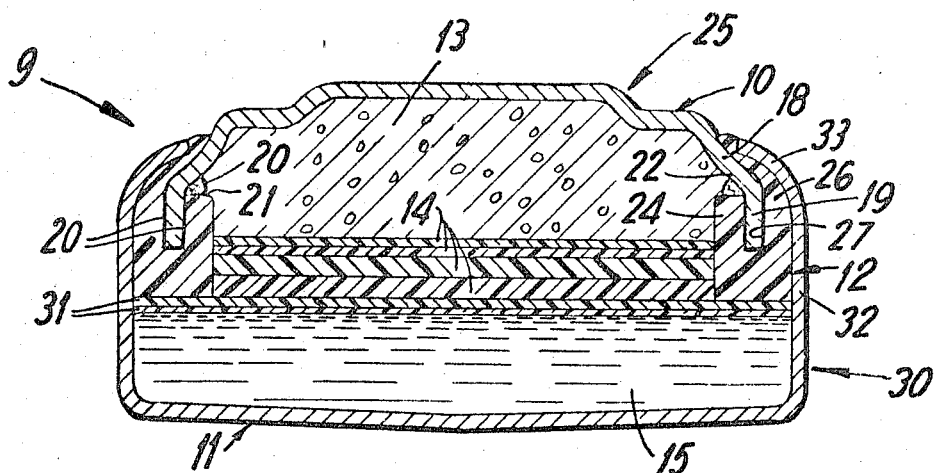
FIG. 1 is a side cross-sectional view of the battery of the present invention after assembly.

As shown in FIG. 1, the battery cell 9 of the present invention includes a top cap 10 which is formed from a conductive material, for example, a duplex stainless steel-phosphor bronze material. The top cap 10 provides one terminal of the cell 9, the other terminal being provided by the bottom can 11. An annular grommet 12 is positioned between top cap 10 and bottom can 11 and electrically insulates the two terminals of the cell. The top cap 10 contains the anode material 13, which may, for example, be a zinc amalgam which is compressed within the top cap 10. Prior to final assembly of the energy cell 9, a suitable alkaline electrolyte, such as potassium hydroxide or sodium hydroxide is added to the zinc amalgam anode.

Figure 3:
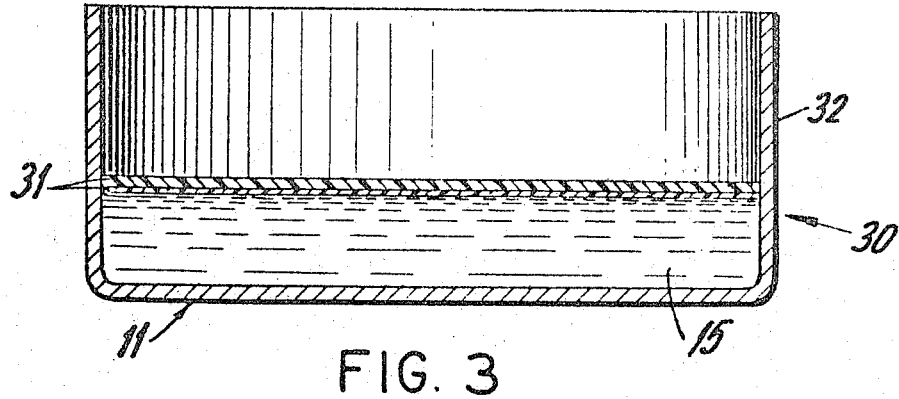

The bottom can 11, see FIG. 3, which depicts the cathode assembly 30, contains a depolarizing cathode material 15 such as a mixture of mercuric oxide with a small percentage of graphite. One or more barrier plates 31, for example, of suitable plastic microporous and plastic separators 14 are positioned between the anode and the cathode. The grommet 12 is positioned about the periphery of the barrier plates 31 and supported thereby.

Figure 2:
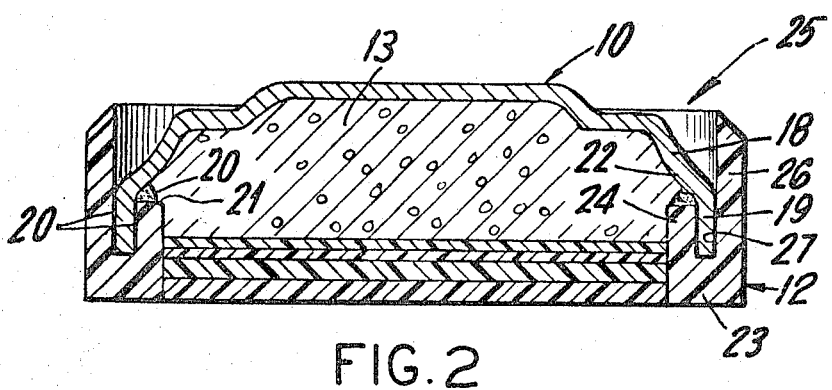
FIG. 2 is a side cross-sectional view of the anode assembly portion of the battery prior to assembly; and, FIG. 3 is a side cross-sectional view of the cathode assembly portion of the battery of FIG. 1 prior to assembly.

FIG. 2 shows the anode assembly 25 with the top cap 10 adhered to the grommet 12. The top cap 10 includes, as an integral portion, a descending flange portion 18 having a vertically descending end portion 19. The grommet 12 comprises a base 23 having inner and outer upwardly extending legs, 24 and 26 which define a slot 27 therebetween. The outer leg 26 is substantially longer than the inner leg 24 for sealing purposes.

The portion 19 of the top cap 10 is coated with adhesive 20 and inserted into the slotted portion 27 of the grommet. The excess adhesive which is scraped from portion 19 of the cap during the insertion operation comes to rest between the shoulder of 21 and the curved inner portion 22 of the top cap. Thus the cap is firmly affixed to the grommet at both the slotted portion 27 and shoulder portion 21 of the grommet. A suitable adhesive 20 is a mixture of epoxy and polysulfide. The top 10 is held against the grommet 12 for about an hour under a pressure, for example, of 20 grams the assembly is thereafter cured under predetermined timetemperature conditions. Each assembly is, after 24 hours, individually tested for its leakproofness with a pressure of 20 lbs. per square inch for 10 seconds.

If the assembly has proven to be leakproof, it is inverted and the zinc amalgam anode material is compressed within the top cap 10. The electrolyte is then added and the top cap 10 is joined, for example, in a fixture with the bottom can 11. At that moment in the assembly operation, the grommet 12 is still as shown in FIG. 2, with the leg 26 of the grommet 12 standing erect.

The final assembly consists of swaging over the free standing wall 32 of the bottom can 11 to form a tight seal against the grommet 12. The swage pressure may be about 1.75 tons. The grommet 12 is held under pressure after the swaging operation is completed by the swaged-over wall portion 33 to effect a thorough seal.

In effect, there are two separate seals for the cell, both of which effectively prevent gas and liquid leakage. The first seal is the adhesive between the flange portion 18 of cap 10 and the shoulder 21 and internal wall of the grommet slot 27. The second seal is the grommet 12 itself which is under compression, between the top cap flange 18 and the swaged-over portion 33 of the bottom can 12.

It is to be understood that the above-described arrangements are merely illustrative examples of the application of the principles of the invention. Numerous other arrangements may be readily devised by those skilled in the art which will embody the principles of the invention and fall within the spirit and scope thereof. For example, it may be possible to make a silver-zinc cell having the same basic construction as the mercury-zinc cell of the present invention. The cathode would comprise a silver oxide-graphite mixture and the dimensions of the electrodes and cell would be different but the principles of the present invention would be applicable.

I claim:

1. A button type of energy cell for timepieces comprising a case containing active anode and cathode materials, said case comprising:
   a can-like member having a base and free-standing side walls extending substantially vertically upward from said base and defining an opening to receive said cathode material,
   a top cap to receive said anode material, said cap having a top protruding contact portion and a descending flange portion extending downwardly and outwardly at an oblique angle from the horizontal and terminating in a vertically descending end portion,
   separating means for separating said anode material from said cathode material,
   said separating means comprising a plurality of separator plates positioned within an annular flexible sealing grommet, and
   a plurality of barrier plates positioned within said can and the peripheral edges of said barrier plates in contact with the free-standing walls of said can, the periphery of said barrier plates underlying a base portion of said grommet and thereby supporting said grommet and separating said base portion of said grommet and the plurality of said separators from said cathode material in said can-like member,
   said annular flexible sealing grommet consisting essentially of said base portion and an inner upwardly extending leg and an outer upwardly extending leg, said pair of spaced upwardly extending legs defining a slot therebetween, said inner leg being shorter than said outer leg, a shoulder formed at the upper end of said inner leg, said shoulder being spaced from the lower surface of said descending flange portion of said top cap,
   the edges of said plurality of separator plates abutting the inner wall of said grommet forming said inner leg and base portion of said grommet, and
   an adhesive disposed in the space between said descending flange portion and said shoulder of said interior wall of said grommet and forming a seal therebetween and adhering the descending flange portion of said top cap to said shoulder, and adhesive disposed between the surfaces of said vertically descending end portion and the walls of said slot thereby adhering said end portion and said walls together, and
   a swagged portion of said free-standing wall of the can-like member swagged to compress the outer upwardly extending leg of said grommet between said swagged portion and the descending flange portion of said top cap to thereby seal said cell, the leakage path of said seal having been substantially lengthened by the cooperation of the slotted grommet and the associated top cap.

2. An energy cell as claimed in claim 1 wherein said adhesive is comprised of an epoxy resin.

3. An energy cell in accordance with claim 1 wherein:
   the cap includes a central base portion, an outwardly flared portion, a downwardly curved portion joining the base portion to the flared portion and a downwardly extending portion connected to the flared portion comprising a concavely curved portion and an outer substantially vertically decending portion.

4. An energy cell in accordance with claim 1 wherein:
   the anode material comprises a zinc amalgam having an alkaline electrolyte added thereto, and
   the cathode material comprises a mixture of mercuric oxide and graphite.

* * * * *